(12) United States Patent
Shibata

(10) Patent No.: US 8,548,136 B2
(45) Date of Patent: Oct. 1, 2013

(54) COMMUNICATION APPARATUS

(75) Inventor: Takeshi Shibata, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 101 days.

(21) Appl. No.: 13/329,918

(22) Filed: Dec. 19, 2011

(65) Prior Publication Data
US 2012/0163573 A1 Jun. 28, 2012

(30) Foreign Application Priority Data
Dec. 22, 2010 (JP) ................................. 2010-286426

(51) Int. Cl.
*H04M 11/00* (2006.01)
(52) U.S. Cl.
CPC ..................... *H04M 11/00* (2013.01)
USPC ............. 379/100.01; 379/100.06; 379/100.17
(58) Field of Classification Search
CPC ..................... H04L 29/06163; H04N 1/00217; H04N 2201/0093
USPC ............. 379/100.01, 100.06–100.09, 90.01, 379/100.17; 358/400, 407, 440, 442, 443, 358/1.15; 370/352; 709/238, 202, 223
See application file for complete search history.

(56) References Cited

U.S. PATENT DOCUMENTS

| | | |
|---|---|---|
| 2002/0025818 A1 | 2/2002 | Kang et al. |
| 2007/0140192 A1 | 6/2007 | Kusumoto et al. |
| 2008/0049748 A1* | 2/2008 | Bugenhagen et al. ........ 370/389 |
| 2008/0144085 A1* | 6/2008 | Song ........................... 358/1.15 |

FOREIGN PATENT DOCUMENTS

| | | |
|---|---|---|
| JP | 1-152861 A | 6/1989 |
| JP | 7-015556 A | 1/1995 |
| JP | 2001-127756 A | 5/2001 |
| JP | 2003-143323 A | 5/2003 |
| JP | 2008-244762 A | 10/2008 |
| JP | 2009-033269 A | 2/2009 |

OTHER PUBLICATIONS

U.S. Appl. No. 13/179,951, to Ohara, dated Jul. 11, 2011.
Extended European Search Report dated Nov. 7, 2012 from related European Application No. 11194353.6.

* cited by examiner

Primary Examiner — Melur Ramakrishnaiah
(74) Attorney, Agent, or Firm — Scully, Scott, Murphy & Presser, PC

(57) ABSTRACT

A communication apparatus includes: a first determining unit that determines whether specific identification information designated as a transmission destination of object data to be transmitted is identification information assigned to an internal device within a LAN including the communication apparatus; a deciding unit that decides a specific guaranteed band to be used for transmission of the object data, from a plurality of guaranteed bands, based on the determination result; and a first communication unit that transmits the object data by performing IP communication using the specific identification information and the specific guaranteed band. If the specific identification information is the identification information assigned to the internal device, the deciding unit decides the specific guaranteed band using a first deciding method. If the specific identification information is not the identification information assigned to the internal device, the deciding unit decides the specific guaranteed band using a second deciding method.

9 Claims, 8 Drawing Sheets

COMMUNICATION APPARATUS

CROSS-REFERENCE TO RELATED APPLICATIONS

This application claims priority from Japanese Patent Application No. 2010-286426 filed on Dec. 22, 2010, the entire subject matter of which is incorporated herein by reference.

TECHNICAL FIELD

The present invention relates to a communication apparatus capable of performing Internet Protocol (IP) communication using any one of a plurality of guaranteed bands.

BACKGROUND

For example, there has been disclosed a terminal device capable of IP communication using any one of a plurality of guaranteed bands (that is, Quality of Service (QoS) values). The terminal device has a plurality of kinds of applications for data communication. The terminal device decides one guaranteed band from the plurality of guaranteed bands in response to the kind of an application to be used, and performs data communication using the guaranteed band.

SUMMARY

In the above-described related-art technology, the guaranteed band is decided based on the kind of the application. In this deciding method, an appropriate guaranteed band may not be decided, and as a result, data communication using an appropriate guaranteed band may not be performed.

Therefore, illustrative aspects of the present invention provide a technology capable of data communication using an appropriate guaranteed band.

According to one illustrative aspect of the invention, there is provided a communication apparatus configured to perform IP communication using one of a plurality of guaranteed bands, comprising: a first determining unit configured to determine whether specific identification information designated as a transmission destination of object data, which is a transmission object, by a user is identification information assigned to an internal device existing in a LAN including the communication apparatus; a deciding unit configured to decide a specific guaranteed band to be used for transmission of the object data, from the plurality of guaranteed bands, based on the determination result of the first determining unit; and a first communication unit configured to transmit the object data by performing the IP communication using the specific identification information and the specific guaranteed band, wherein the deciding unit is configured to: in a case where the specific identification information is determined to be the identification information assigned to the internal device, decide the specific guaranteed band using a first deciding method; and in a case where the specific identification information is determined to be not the identification information assigned to the internal device, decide the specific guaranteed band using a second deciding method that is different from the first deciding method.

According thereto, the communication apparatus decides a guaranteed band by using different deciding methods according to whether specific identification information, which a user designates as a transmission destination, is identification information assigned to an internal device. That is, the communication apparatus can decide an appropriate guaranteed band based on whether the communication apparatus and a transmission destination device of object data exist in the same LAN. Therefore, the communication apparatus can perform data communication using an appropriate guaranteed band.

Incidentally, a control method, a computer program, and a non-transitory computer-readable medium for storing the computer program for implementing the communication apparatus are also newly useful.

DETAILED DESCRIPTION

First Exemplary Embodiment

Configuration of System

Figure 1:
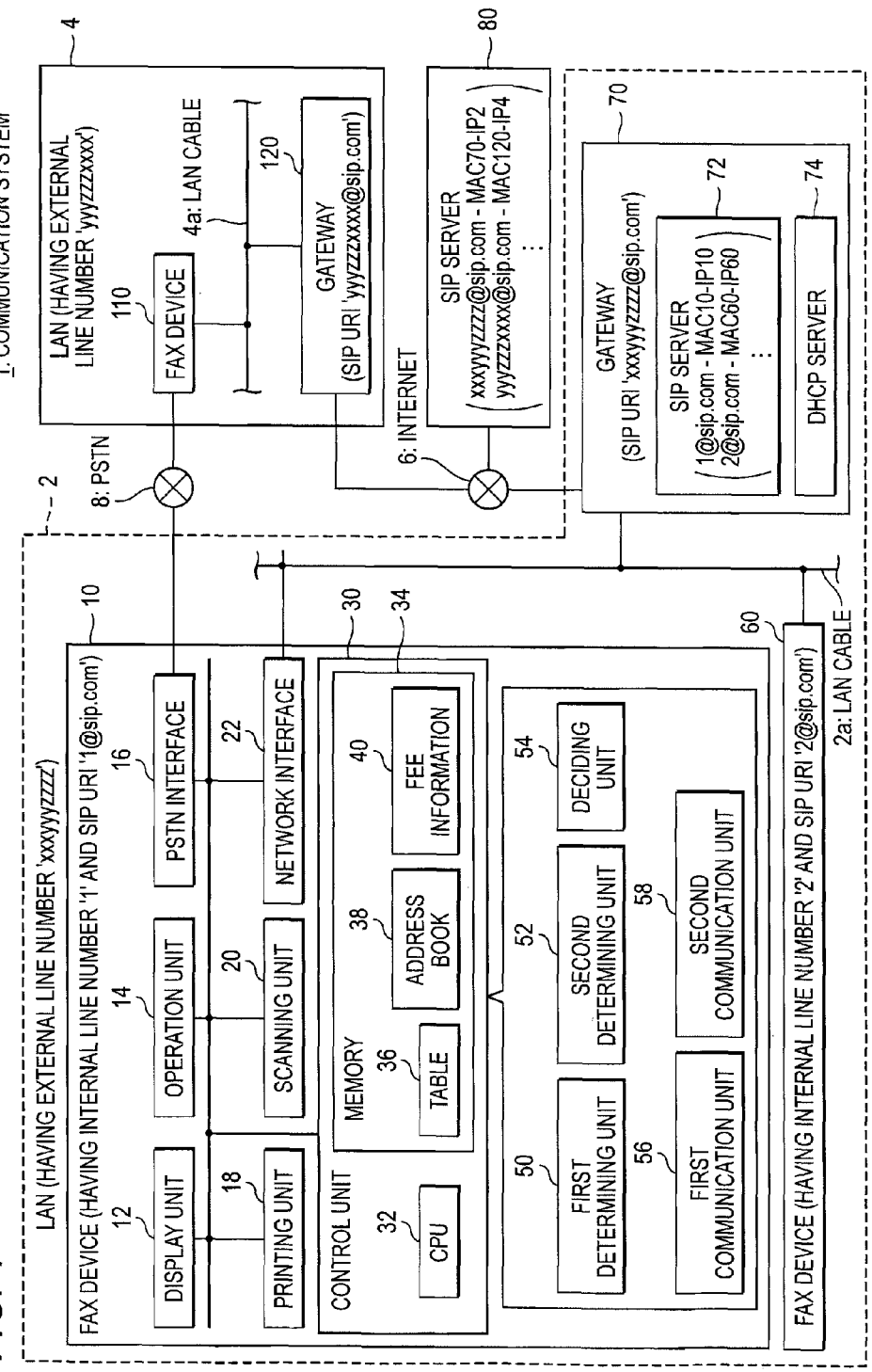
FIG. 1 shows an example of a configuration of a communication system.

As shown in FIG. 1, a communication system 1 includes a plurality of LANs 2 and 4. Each of the LANs 2 and 4 is, for example, a LAN established in an ordinary house, a company, or the like. Each of the LANs 2 and 4 can be called an internal line network.

(Configuration of LAN 2)

The LAN 2 includes a plurality of fax devices 10 and 60, and a gateway 70. That is, the individual devices 10, 60, and 70 exist in the same LAN 2. The fax device 10 is connected to a PSTN 8. Therefore, the fax device 10 can perform telephone communication and fax communication through the PSTN 8. Incidentally, the fax device 60 is not connected to the PSTN 8. The individual devices 10, 60, and 70 are connected to a LAN cable 2a. Therefore, the individual devices 10, 60, and 70 can perform IP communication (that is, communication using an Internet protocol) with one another through the LAN cable 2a. Incidentally, in the present exemplary embodiment, the LAN 2 which is a wired network using the LAN cable 2a is configured. Alternatively, in a modification, a wireless network using a wireless access point may be configured. The gateway 70 is connected to the Internet 6. Therefore, each of the fax devices 10 and 60 can perform EP communication with a device, which is outside the LAN 2, through the gateway 70.

An external line number (that is, a number string having a predetermined number of digits, in which each digit represents a decimal value, for example) 'xxxyyyzzzz' used in the PSTN 8 is assigned to the LAN 2. Further, internal line numbers '1' and '2' are assigned to the fax devices 10 and 60.

(Configuration of Fax Device 10)

The fax device 10 having multiple functions such as a PSTN fax function, an IP fax function, a copy function, a printer function, and a scanner function. The PSTN fax function is a function for performing fax communication (that is, transmission and reception of fax data) through the PSTN 8 by using an external line number (that is, a fax number) used in the PSTN 8. The PSTN fax function is implemented in accordance with a G3 communication scheme. Incidentally, the PSTN fax function can also be implemented in the same LAN 2. For example, in a case where the fax devices 10 and 60 are connected to each other by a cable (not shown) different from the LAN cable 2*a*, the fax device 10 can perform fax communication through the corresponding cable by using the internal line number '2' of the fax device 60. The IP fax function is a function for performing fax communication through an IP network (the LAN cable 2*a*, the Internet 6, and the like) by using a uniform resource identifier (URI). In the present exemplary embodiment, the IP fax function is implemented in accordance with a session initiation protocol (SIP) communication scheme. Alternatively the IP fax function may be implemented in accordance with any other protocols based on IP.

The fax device 10 includes a display unit 12, an operation unit 14, a PSTN interface 16, a printing unit 18, a scanning unit 20, a network interface 22, and a control unit 30. The individual units 12 to 30 are connected to bus lines. The display unit 12 is a display for displaying a variety of information. The operation unit 14 includes a plurality of keys. A user can input various instructions to the fax device 10 by operating the operation unit 14. The PSTN interface 16 is connected to the PSTN 8. The printing unit 18 has a printing mechanism such as an inkjet type or a laser type. The printing unit 18 is configured to perform printing in response to an instruction from the control unit 30. The scanning unit 20 has a scanning mechanism such as a CIS type or a CCD type. The scanning unit 20 is configured to scan a scan object so as to generate image data. The network interface 22 is connected to the LAN cable 2*a*.

The control unit 30 includes a CPU 32 and a memory 34. The CPU 32 is configured to execute processes in accordance with programs (not shown) stored in the memory 34. The CPU 32 implements the functions of each of a first determining unit 50, a second determining unit 52, a deciding unit 54, a first communication unit 56 and a second communication unit 58 (which will be described later) by executing a process in accordance with a corresponding program. The memory 34 stores a table 36, an address book 38, and fee information 40. The table 36 includes at least one enterprise-number representing at least one specific provider. The specific provider is a provider which provides an IP fax function using a SIP URI including an external line number to be used in PSTN 8 (that is, a SIP URI obtained by adding a predetermined domain to an external line number). Incidentally, each enterprise-number is an enterprise code number specific to a corresponding provider. The address book 38 includes a plurality of fax numbers, telephone numbers, and the like input by the user. The fee information 40 will be described later (see STEP S86 of FIG. 6).

The table 36 is stored in the memory 34 in advance. For example, the table 36 may be stored in the memory 34 in advance by a vendor of the fax device 10. Alternatively, for example, the fax device 10 may acquire the table 36 from a predetermined server (for example, a server which the vendor of the fax device 10 provides), and store the table 36 in the memory 34 in advance.

The user can describe information (such as a combination of a name and an external line number) in the address book 38 by operating the operation unit 14. The fee information 40 is information provided by the specific provider. For example, the fax device 10 may install the fee information 40 from a storage medium (for example, a USB memory provided by the specific provider and store the fee information 40 in the memory 34, or may install the fee information 40 from a server provided by the specific provider and store the fee information 40 in the memory 34.

Incidentally, the fax device 60 has the same configuration as that of the fax device 10 except that the fax device 60 is not connected to the PSTN 8.

(Configuration of Gateway 70)

When a manager of the LAN 2 (that is, the user of the fax devices 10 and 60) makes a contract with the specific provider, the specific provider provides the gateway 70 to the manager. The manager connects the gateway 70 to the LAN cable 2*a*. Accordingly, the gateway 70 acts as a gateway for relaying communication between the LAN 2 and the Internet 6.

A SIP URI 'xxxyyyzzzz@sip.com' including the external line number 'xxxyyyzzzz' of the LAN 2 is assigned to the gateway 70. The SIP URI is obtained by adding a predetermined domain 'sip.com' (for example, a domain owned by the specific provider) to the external line number 'xxxyyyzzzz' of the LAN 2. Incidentally, if the gateway 70 is introduced to the LAN 2, a SIP URI '1@sip.com' is assigned to the fax device 10, and a SIP URI '2@sip.com' is assigned to the fax device 60. Each of those SIP URIs is obtained by adding the predetermined domain to a corresponding internal line number.

The gateway 70 also acts as a SIP server (may be called a call control server) 72. With respect to each of the plurality of fax devices 10 and 60, the SIP server 72 stores the SIP URI of the corresponding fax device and a local IP address of the corresponding fax device mapped with each other. In FIG. 1, a MAC address and the local IP address of the fax device 10 are denoted by 'MAC10' and 'IP10'. Similarly, a MAC address and the local IP address of the fax device 60 are denoted by 'MAC60' and 'IP60'. Since the SIP server 72 has information on the individual fax devices 10 and 60 stored therein, the SIP server 72 can relay SIP communication between the pair of fax devices 10 and 60 which is provided within the LAN 2. For example, in order to establish a SIP communication session between the fax device 10 and the fax device 60, various commands are transmitted and received between the fax devices 10 and 60. Those commands are transmitted through the SIP server 72. The SIP server 72 can also relay SIP communication between a device which is provided within the LAN 2 and a device which is outside the LAN 2.

The gateway 70 also acts as a dynamic host configuration protocol (DHCP) server 74. The DHCP server 74 assigns an IP address to each device (such as the fax devices 10 and 60) which is provided within the LAN 2. The DHCP server 74 has DHCP information stored therein. The DHCP information includes an option 120 (an IP address of the SIP server 72) and an option 125 (provider information representing the specific provider) to be described later.

(Configuration of LAN 4)

The LAN 4 includes a fax device 110 and a gateway 120. The fax device 110 is connected to a PSTN 8. The individual devices 110 and 120 are connected to a LAN cable 4*a*. The gateway 120 is connected to the Internet 6. An external line number (that is, a number string having a predetermined number of digits) 'yyyzzzxxxx' used in the PSTN 8 is assigned to the LAN 4. Incidentally, although not shown, the internal number '1' is also assigned to the fax device 110.

Similarly to the gateway 70, the gateway 120 is provided by the specific provider. A SIP URI 'yyyzzzxxxx@sip.com' including the external line number 'yyyzzzxxxx' of the LAN 4 is assigned to the gateway 120. Although not shown, a SIP URI '1@sip.com' including the internal line number '1' of the fax device 110 is assigned to the fax device 110. Similarly to the gateway 70, the gateway 120 acts as a SIP server and a DHCP server.

(Configuration of SIP Server 80 on the Internet 6)

A SIP server 80 is provided by the specific provider. With respect to the plurality of LANs 2 and 4, the SIP server 80 stores a SIP URI assigned to the corresponding LAN (that is, the SIP URI assigned to the gateway), the MAC address of the gateway which is in the corresponding LAN, and the local IP address of the corresponding LAN mapped with one another. In FIG. 1, the MAC addresses of the gateways 70 and 120 are denoted by 'MAC70' and 'MAC120', respectively, and the local IP addresses of the LANs 2 and 4 are denoted by 'IP2' and 'IP4', respectively. Since the SIP server 80 has information on the individual LANs 2 and 4 stored therein, the SIP server 80 can relay SIP communication between the pair of LANs 2 and 4.

(Main Process)

Figure 2:
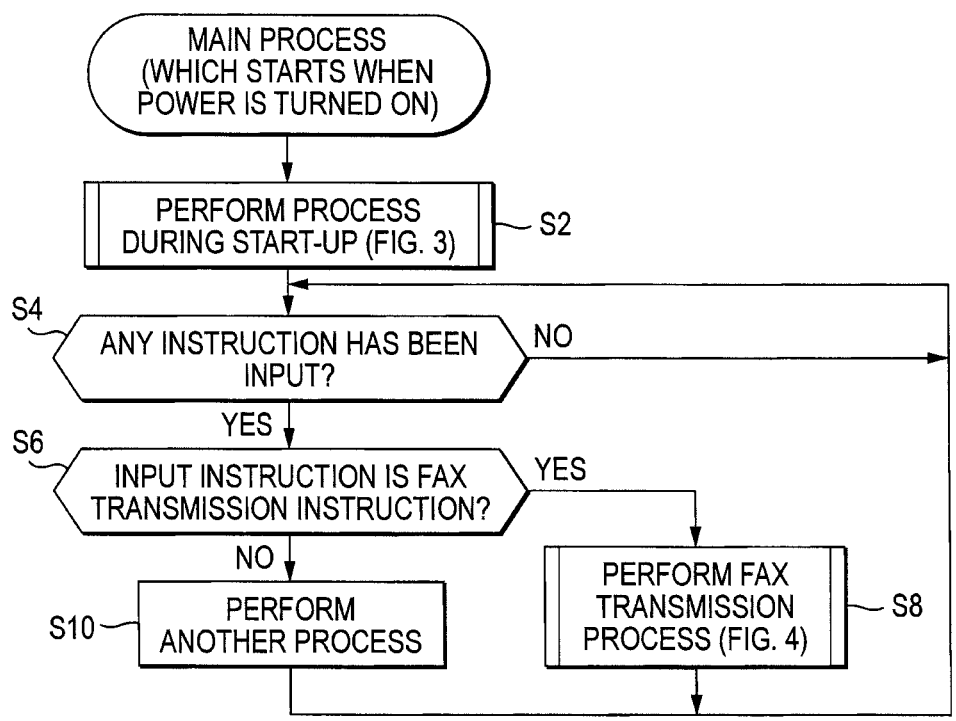
FIG. 2 shows a flow chart of a main process.

Subsequently, various processes which the fax device 10 performs will be described. As shown in FIG. 2, the control unit 30 of the fax device 10 performs the main process after the fax device 10 is powered up. In STEP S2, the control unit 30 performs a process during start-up (see FIG. 3). Next, in STEP S4, the control unit 30 performs monitoring to check whether any instruction is input. An instruction may be input by operating the operation unit 14 or may be input from the external through the PSTN 8 or the LAN cable 2a.

In a case where any instruction has been input (Yes in STEP S4), in STEP S6, the control unit 30 determines whether the corresponding instruction is a fax transmission instruction or not. The user can input a fax transmission instruction by operating the operation unit 14. The fax transmission instruction includes an internal line number or external line number of a transmission destination of fax data designated by the user. For example, the user can designate the external line number 'yyyzzzxxxx' of the LAN 4 as the transmission destination of the fax data. Also, for example, the user can designate the internal line number '2' of the fax device 60 as the transmission destination of the fax data. Incidentally, the user may designate an internal line number or external line number from the address book 38, or may designate an internal line number or external line number by operating the operation unit 14.

Figure 4:
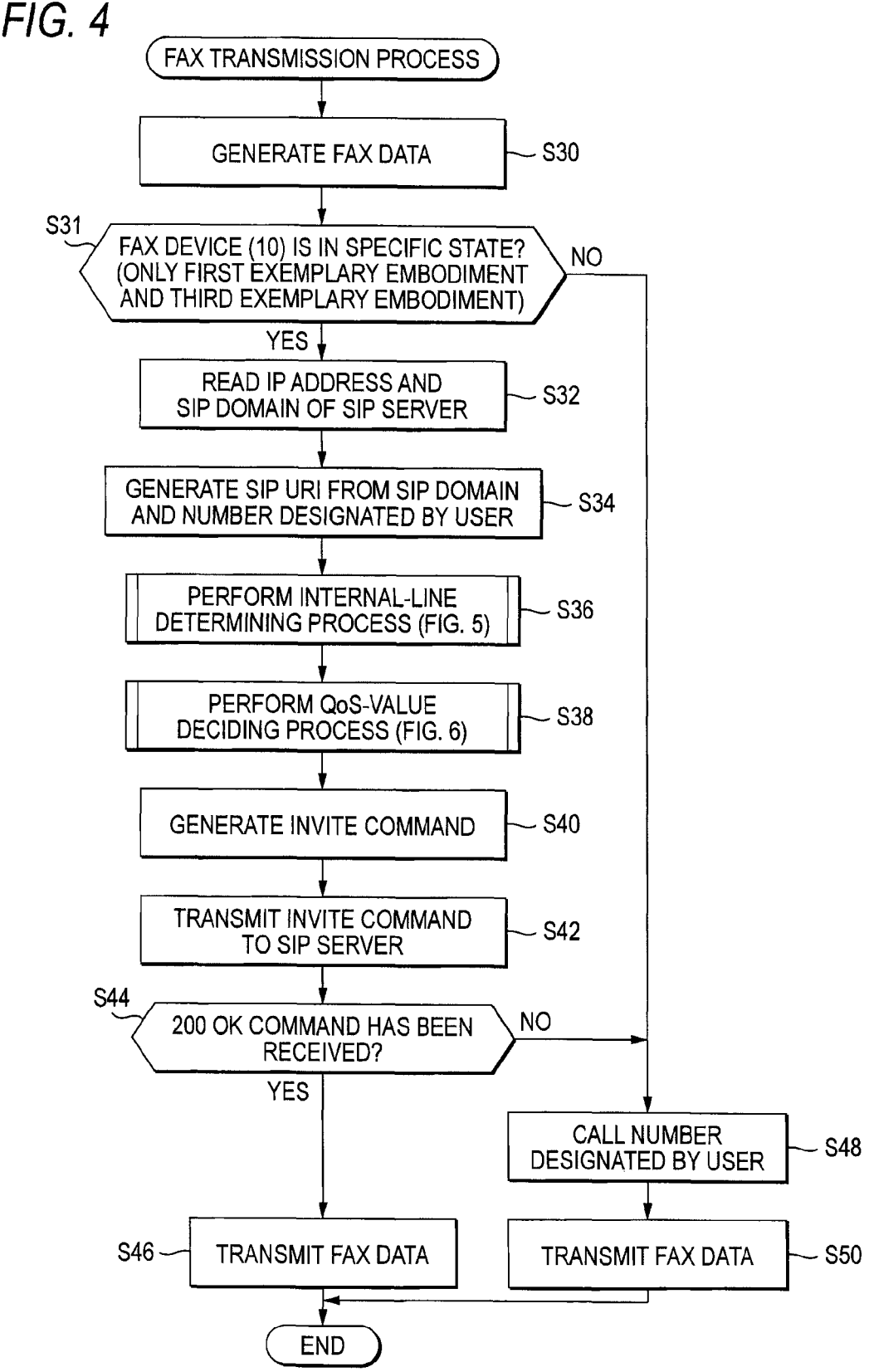
FIG. 4 shows a flow chart of a fax transmission process.

In a case where the input instruction is a fax transmission instruction (YES in STEP S6), in STEP S8, the control unit 30 performs a fax transmission process (see FIG. 4). On the other hand, in a case where the input instruction is not a fax transmission instruction (NO in STEP S6), in STEP S10, the control unit 30 performs a process according to the input instruction (for example, a printing instruction, a fax-data reception instruction, or the like).

(Process During Start-Up)

Subsequently, the contents of the process during start-up performed in STEP S2 of FIG. 2 will be described. The process during start-up is a process for determining whether the fax device 10 is in a specific state or not. The above-described 'specific state' is a state in which the fax device 10 can perform an IP fax transmission process of transmitting fax data using an SIP URI including an external line number or an internal line number designated as the transmission destination of the fax data by the user (SIP URI obtained by adding the predetermined domain to the external line number or the internal line number). Incidentally, the above-described 'specific state' can be said as, for example, a state in which the user is under contract with the specific provider.

Figure 3:
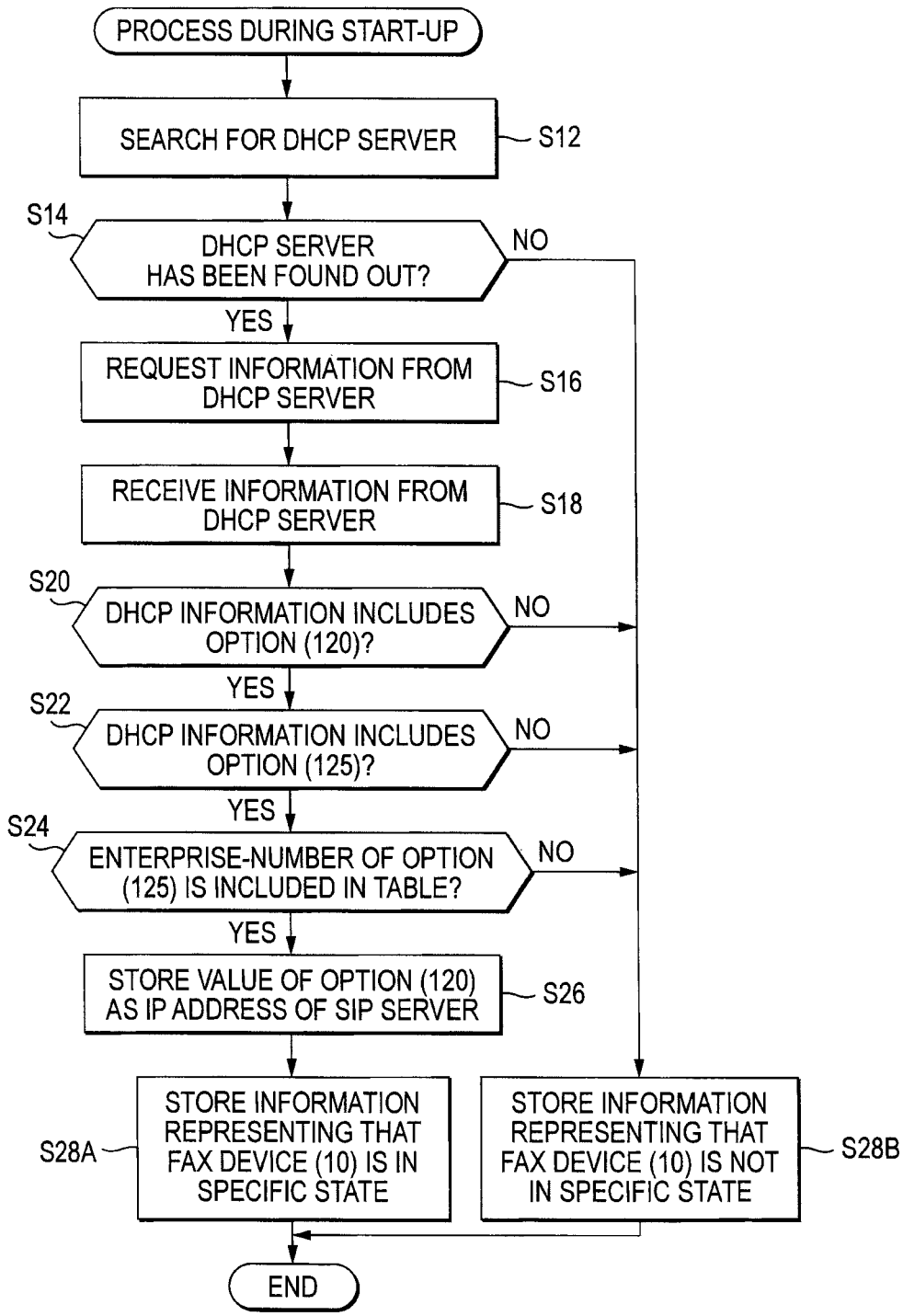
FIG. 3 shows a flow chart of a process during start-up.

As shown in FIG. 3, in STEP S12, the control unit 30 broadcasts a search command for searching for the DHCP server 74 which is provided within the LAN 2. Upon receiving the search command, the DHCP server 74 transmits a response packet including the IP address of the DHCP server 74 (that is, the IP address of the gateway 70) to the fax device 10. Next, in STEP S14, the control unit 30 determines whether the DHCP server 74 has been found out. In a case where the control unit 30 has received the response packet after having broadcasting the search command, the result of the determination in STEP S14 becomes YES. In the case where the result of the determination in STEP S14 is YES, the process during start-up proceeds to STEP S16. On the other hand, in a case where the result of the determination in STEP S14 is NO, the process during start-up proceeds to STEP S28B.

In STEP S16, the control unit 30 transmits a request command to the IP address of the DHCP server 74 included in the response packet as the transmission destination. The request command is a command for requesting the DHCP information including the option 120 and the option 125. The option 120 and the option 125 will be described later. Upon receiving the request command, the DHCP server 74 transmits the DHCP information to the fax device 10. Therefore, in STEP S18, the control unit 30 receives the DHCP information.

Next, in STEP S20, the control unit 30 determines whether the DHCP information includes the option 120 or not. For example, in a case where the manager of the LAN 2 is under contract with the specific provider, the DHCP information includes the option 120 representing the IP address of the SIP server 72 (that is, the IP address of the gateway 70) provided by the specific provider. In this case, the result of the determination in STEP S20 becomes YES, and the process during start-up proceeds to STEP S22. On the other hand, in a case where the manager of the LAN 2 is not under contract with the specific provider, generally, the DHCP information does not include the option 120. In this case, the result of the determination in STEP S20 becomes NO, and the process during start-up proceeds to STEP S28B.

In the case where the result of the determination in STEP S20 is YES, in STEP S22, the control unit 30 determines whether the DHCP information includes the option 125. For example, in a case where the manager of the LAN 2 is under contract with the specific provider, the DHCP information includes the option 125 representing the enterprise-number of the specific provider. In this case, the result of the determination in STEP S22 becomes YES, and the process during start-up proceeds to STEP S24. On the other hand, in a case where the manager of the LAN 2 is not under contract with the specific provider but is under contract with another provider providing SIP communication, the DHCP information includes the option 120 but may not include the option 125. In this case, the result of the determination in STEP S22 becomes NO, and the process during start-up proceeds to STEP S28B. Incidentally, the above-described 'another provider' is, for example, a provider which provides the IP fax function using a SIP URI having no relation with any internal line number or external line number instead of the IP fax function using a SIP URI obtained by adding the predetermined domain to an internal line number or an external line number.

In the case where the result of the determination in STEP S22 is YES, in STEP S24, the control unit 30 determines whether the enterprise-number included in the option 125 corresponds to any enterprise-number included in the table 36 (see FIG. 1). In the case where the manager of the LAN 2 is under contract with the specific provider, the enterprise-number included in the option 125 corresponds to any one enterprise-number included in the table 36. In this case, the result of the determination in STEP S24 becomes YES, and the process during start-up proceeds to STEP S26. On the other hand, for example, in the case where the manager of the LAN 2 is under contract with another provider, the DHCP information includes the option 125; however, the enterprise-number included in the corresponding option 125 may not correspond to any enterprise-number included in the table 36. In this case, the result of the determination in STEP S24 becomes NO, and the process during start-up proceeds to STEP S28B.

The case where the result of the determination in STEP S24 is YES means that it is determined that the fax device 10 is in the specific state. In this case, in the present exemplary embodiment, a value represented by the option 120 of the DHCP information acquired in STEP S18 is the IP address of the SIP server 72 (that is, the IP address of the gateway 70). In STEP S26, the control unit 30 stores the IP address of the SIP server 72 in the memory 34. Then, in STEP S28A, the control unit 30 stores determination result information, representing that the fax device 10 is in the specific state, in the memory 34.

Incidentally, the case where the result of the determination in any one of STEPS S14, S20, S22, and S24 is NO means that it is determined that the fax device 10 is not in the specific state. In this case, in STEP S28B, the control unit 30 stores determination result information, representing that the fax device 10 is not in the specific state, in the memory 34.

(Fax Transmission Process)

Subsequently, the contents of the fax transmission process performed in STEP S28 of FIG. 2 will be described. As shown in FIG. 4, in STEP S30 the control unit 30 controls the scanning unit 20 to scan a document so as to generate fax data.

Next, in STEP S31, a second determining unit 52 (see FIG. 1) reads the determination result information (see STEPS S28A and S28B of FIG. 3) from the memory 34, and determines whether the determination result information represents that the fax device 10 is in the specific state or that the fax device 10 is not in the specific state. In a case where the determination result information represents that the fax device 10 is in the specific state (YES in STEP S31), the fax transmission process proceeds to STEP S32. On the other hand, in a case where the determination result information represents that the fax device 10 is not in the specific state (NO in STEP EP S31), the fax transmission process skips STEPS S32 to S44 (to be described later) and proceeds to STEP S48.

In STEP S32, a first communication unit 56 (see FIG. 1) reads the IP address and SIP domain of the SIP server from the memory 34. As described above, in the case where the fax device 10 is in the specific state, in STEP S26 of FIG. 3, the IP address of the SIP server 72 is stored in the memory 34. Accordingly, in STEP S32, the first communication unit 56 can read the IP address, stored in STEP S26 of FIG. 3, from the memory 34.

However, even if the process during start-up of FIG. 3 is performed, the SIP domain 'sip.com' of the SIP server 72 is not stored in the memory 34. In general, the specific provider provides the SIP domain of the SIP server 72 to the server when (or after) making a contract with the user. For example, the specific provider can provide the SIP domain of the SIP server 72 by giving the user a medium (for example, a sheet) having the SIP domain of the SIP server 72 written thereon. Alternatively, the specific provider can provide the SIP domain of the SIP server 72 to the user by disclosing the SIP domain of the SIP server 72 on a website or the like. Accordingly, the user can store the SIP domain of the SIP server 72 in the memory 34 by performing predetermined storage operation on the operation unit 14. In STEP S36, the first communication unit 56 can read the SIP domain of the SIP server 72, stored in the fax device 10 by operation of the user, from the memory 34. Incidentally, in a modification, the fax device 10 may acquire the SIP domain of the SIP server 72 from the gateway 70 (that is, the SIP server 72).

Next, in STEP S34, the first communication unit 56 adds the SIP domain 'sip.com', read in STEP S32, to a number designated as the transmission destination of the fax data by the user, so as to generate a SIP URI of the transmission destination of the fax data. For example, in a case where the external line number 'yyyzzzxxxx' of the LAN 4 is designated by the user, the first communication unit 56 generates 'yyyzzzxxxx@sip.com'. Also, for example, in a case where the internal line number '2' of the fax device 60 is designated by the user, the first communication unit 56 generate '2@sip.com'.

(Internal-Line Determining Process)

Figure 5:
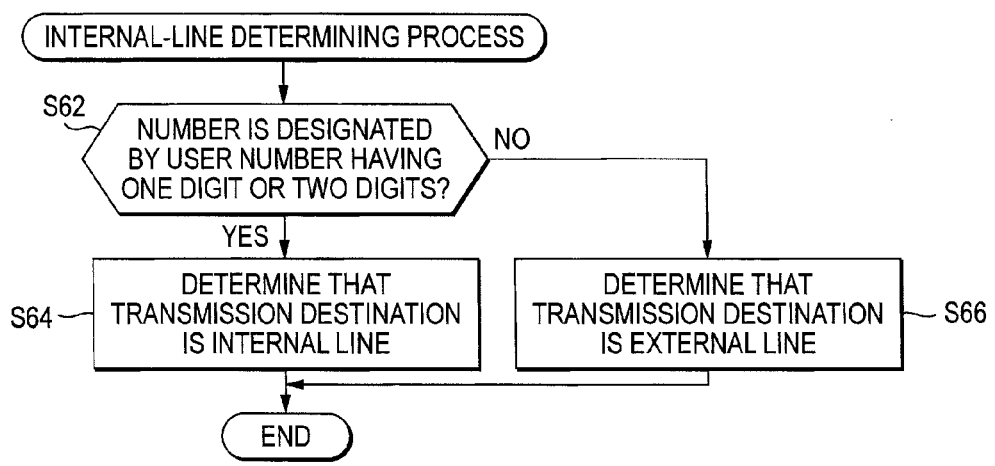
FIG. 5 shows a flow chart of an internal-line determining process.

Next, in STEP S36, a first determining unit 50 (see FIG. 1) performs an internal-line determining process. As shown in FIG. 5, in the internal-line determining process, in STEP S62, the first determining unit 50 determines whether the number designated as the transmission destination of the fax data by the user is a number having one digit or two digits, or a number having three or more digits. Here, each digit represents a decimal value, for example. In a case where the number designated by the user is a number having one digit or two digits (YES in STEP S62), in STEP S64, the first determining unit 50 determines that the transmission destination is an internal line. On the other hand, in a case where the number designated by the user is a number having three or more digits (NO in STEP S62), in STEP S66, the first determining unit 50 determines that the transmission destination is an external line.

In general, numbers having three or more digits are not used as internal line numbers. This is because several three-digit numbers (such as '110' and '119') have been already used in the PSTN 8. Therefore, if whether the number designated by the user is a number having one digit or two digits, or not is used as a determination criterion, as in the present exemplary embodiment, it is possible to appropriately perform the internal-line determining process.

(QoS-Value Deciding Process)

Figure 6:
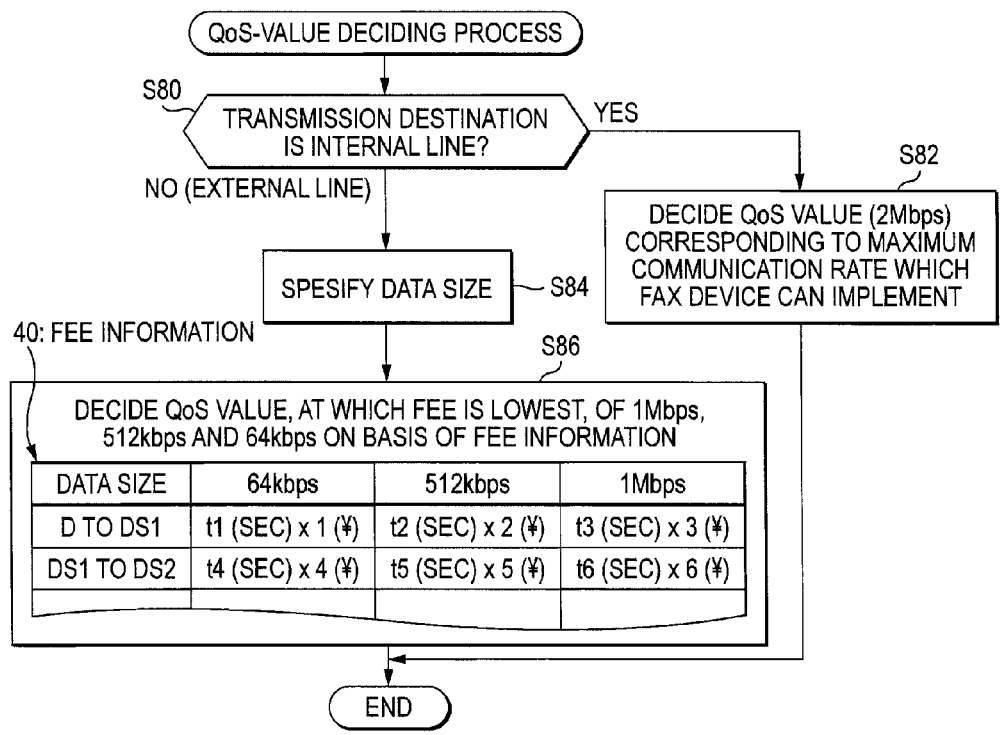
FIG. 6 shows a flow chart of a QoS-value deciding process.

After completing the internal-line determining process, in STEP S38 of FIG. 4, a deciding unit 54 (see FIG. 1) performs a QoS-value deciding process. As shown in FIG. 6, in the QoS-value deciding process, the deciding unit 54 determines whether it has been determined in the internal-line determining process of FIG. 5 that the transmission destination is an internal line in STEP S80. In a case where it is determined in STEP S64 of FIG. 5 that the transmission destination is an internal line, the result of the determination of the deciding unit 54 in STEP S80 becomes YES, and thus the internal-line determining process proceeds to STEP S82. On the other hand, in a case where it is determined in STEP S66 of FIG. 5 that the transmission destination is an external line, the result of the determination of the deciding unit 54 in STEP S80 becomes NO, and thus the internal-line determining process proceeds to STEP S84.

In STEP S82 (in a case where the transmission destination is an internal line), the deciding unit 54 decides (selects) a QoS value (2 Mbps), corresponding to the maximum communication rate which the fax device 10 can implement, as a QoS value to be used for IP fax communication. On the other hand, in STEPS S84 and S86 (in a case where the transmission destination is an external line), the deciding unit 54 decides (selects) the QoS value by using a method different from that in STEP S82. The specific provider uses three QoS values of 1 Mbps, 512 kbps, and 64 kbps as QoS values usable for fax communication through the Internet 6. The fee per unit communication time is different at each of the three QoS values. In a modification, the fee per unit communication data size may be different at each of the three QoS values. In STEPS S84 and S86, the deciding unit 54 decides any one QoS value of the three QoS values.

Specifically, in STEP S84, the deciding unit 54 specifies the data size of the fax data generated in STEP S30 of FIG. 4. Next, in STEP S86, based on the data size specified in STEP S84 and the fee information 40 stored in the memory 34, the deciding unit 54 decides a QoS value, at which the fee required for transmitting the fax data is the lowest, of the three QoS values, as the QoS value to be used for the IP fax communication. Incidentally, the fee information 40 represents relations between data sizes of transmission object data and fees at each of the three QoS values. Therefore, by using the data size specified in STEP S84 and the fee information 40, the deciding unit 54 can decide a QoS value at which the required fee is the lowest.

Incidentally, in a modification, the fee information 40 may be information representing combinations of the data sizes of the transmission object data and the QoS values at which the required fees are the lowest. Alternatively, the fee information 40 may be information representing combinations of the data sizes of the transmission object data and transmission times. In this case, with respect to each of the three QoS values, based on the data size specified in STEP S84, the deciding unit 54 specifies a transmission time required in a case where the corresponding QoS value is used. Next, with respect to each of the three QoS values, based on the transmission time specified at the corresponding QoS value and the fee per unit communication time at the corresponding QoS value, the deciding unit 54 computes a required fee. As a result, the deciding unit 54 can decide a QoS value at which the required fee is the lowest.

After completing the QoS-value deciding process, in STEP S40 of FIG. 4, the first communication unit 56 generates an INVITE command including the QoS value decided in STEP S38. Incidentally, in STEP S40, the first communication unit 56 generates the INVITE command including the SIP URI, generated in STEP S34 and designated as the transmission destination, and the SIP URI '1@sip.com' of the fax device 10 designated as a transmitter.

Next, in STEP S42, the first communication unit 56 transmits the INVITE command to the SIP server 72. As described above, in STEP S26 of FIG. 3, the IP address of the SIP server 72 is stored in the memory 34. In STEP S42, the first communication unit 56 designates the IP address of the SIP server 72 stored in the memory 34, as a SIP server address, and transmits the INVITE command to the SIP server address. As a result, the INVITE command reaches the SIP server 72.

(Case where Transmission Destination is Internal Line)

For example, it is assumed that the user designates the internal line number '2' of the fax device 60 as the transmission destination of the fax data. In this case, the SIP server 72 receives the INVITE command including the QoS value of 2 Mbps decided in STEP S82 of FIG. 6. The INVITE command includes the SIP URI '2@sip.com' of the fax device 60 designated as the transmission destination, and the SIP URI '1@sip.com' of the fax device 10 designated as the transmitter. As shown in FIG. 1, the SIP server 72 stores the SIP URI '2@sip.com', designated as the transmission destination in the INVITE command, and the local IP address 'IP60' of the fax device 60 mapped with each other. Accordingly, the SIP server 72 can transmit the INVITE command to the local IP address of the fax device 60 which is the transmission destination. Therefore, the fax device 60 receives the INVITE command.

In a case where the fax device 60 is capable of communication using the QoS value of 2 Mbps included in the INVITE command, the fax device 60 transmits a 200 OK command to the SIP server 72. The SIP server 72 transmits the 200 OK command to the fax device 10. In this case, the determination of the first communication unit 56 of the fax device 10 in STEP S44 becomes YES, and thus the fax transmission process proceeds to STEP S46. On the other hand, for example, in cases such as a case where the power of the fax device 60 is in an OFF state and a case where the fax device 60 is incapable of communication using the QoS value of 2 Mbps, the SIP server 72 transmits a command that is different from the 200 OK command to the fax device 10. In this case, the result of the determination the first communication unit 56 of the fax device 10 in STEP S44 becomes NO, and thus the fax transmission process proceeds to STEP S48.

(Case where Transmission Destination is External Line)

For example, it is assumed that the user designates the external line number 'yyyzzzxxxx' of the LAN 4 as the transmission destination of the fax data. In this case, the SIP server 72 receives the INVITE command including the QoS value (that is, any one of 1 Mbps, 512 kbps, and 64 kbps) decided in STEP S86 of FIG. 6. The INVITE command includes the SIP URI 'yyyzzzxxxx@sip.com' of the gateway 120 (that is, the SIP URI of the LAN 4) designated as the transmission destination, and the SIP URI '1@sip.com' of the fax device 10 designated as the transmitter. The SIP server 72 has not stored the SIP URI 'yyyzzzxxxx@sip.com' designated as the transmission destination in the INVITE command (see FIG. 1). Accordingly, the SIP server 72 transmits the INVITE command to the SIP server 80 which is on the Internet 6. However, the SIP server 72 changes the SIP URI '1@sip.com', designated as the transmitter in the INVITE command, to the SIP URI 'xxxyyyzzzz@sip.com' of the gateway 70 (that is, the SIP URI of the LAN 2).

As shown in FIG. 1, the SIP server 80 has stored the SIP URI 'yyyzzzxxxx@sip.com', designated as transmission destination in the INVITE command, and the local IP address 'IP4' of the LAN 4 mapped with each other. Accordingly, the SIP server 80 can transmit the INVITE command to the local IP address of the LAN 4 which is the transmission destination. Therefore, the gateway 120 (that is, the SIP server of the LAN 4) receives the INVITE command. The gateway 120 transmits the INVITE command to the fax device 110.

In a case where the fax device 110 is capable of communication using the QoS value included in the INVITE command, the fax device 110 transmits the 200 OK command to the gateway 120. As a result, the 200 OK command is transmitted to the fax device 110 through the gateway 120, the SIP server 80, and the gateway 70. In this case, the result of the determination of the first communication unit 56 of the fax device 10 in STEP S44 becomes YES, and thus the fax transmission process proceeds to STEP S46. On the other hand, for example, in cases such as a case where the power of the fax device 110 is in the OFF state and a case where the fax device 110 is incapable of communication using the QoS value included in the INVITE command, the gateway 120 transmits a command, different from the 200 OK command, to the SIP server 80. As a result, the corresponding different command is transmitted to the fax device 10 through the SIP server 80 and the gateway 70. In this case, the result of the determination of the first communication unit 56 of the fax device 10 becomes NO, and thus the fax transmission process proceeds to STEP S48.

(IP Fax Communication)

In STEP S46, the SIP communication session is established between the fax device 10 and the transmission destination device (the fax device 60 or the fax device 110 in the above-described example). The first communication unit 56 transmits the fax data, generated in STEP S30, using the established communication session. Here, the first communication unit 56 transmits the fax data at a communication rate corresponding to the QoS value decided in the QoS-value deciding process of FIG. 6 (that is, the QoS value included in the INVITE command). Incidentally, in STEP S46, the fax data is transmitted from the fax device 10 to the transmission destination device (that is, P2P communication is performed) without relaying the SIP server 72 (without relaying the SIP server 80 in the case where the transmission destination is an external line). After completing the transmission of the fax data in STEP S46, the fax transmission process ends.

(PSTN Fax Communication)

In STEP S48, a second communication unit 58 (see FIG. 1) performs a calling process according to the G3 communication scheme, using the internal line number or the external line number designated as the transmission destination of the fax data by the user. For example, in a case where the user designates the internal line number '2', a G3 communication channel through a cable (not shown) different from the LAN cable 2a is established between the fax device 10 and the fax device 60. Also, for example, in a case where the user designates the external line number 'yyyzzzxxxx' a G3 communication channel through the PSTN 8 is established between the fax device 10 and the fax device 110. Next, in STEP S50, the second communication unit 58 transmits the fax data, generated in STEP S30, using the communication channel established in STEP S48. As described above, in the present exemplary embodiment, in a case where the fax device 10 is not in the specific state or a case where the 200 OK command is not received, the fax device 10 can perform fax communication according to the G3 communication scheme, using a number designated by the user. In the case where the fax device 10 is not in the specific state, the fax device 10 can perform appropriate fax communication. After completing the transmission of the fax data in STEP S50, the fax transmission process ends.

In generally known fax devices, in order to transmit fax data in accordance with the G3 communication scheme, a user designate an internal line number or an external line number (that is, a number string) as the transmission destination of the fax data. If the user performs operation like that, the fax device 10 of the present exemplary embodiment can transmit the fax data in accordance with the SIP communication scheme. That is, if the user designates an internal line number or an external line number without designating a SIP URI as the transmission destination of the fax data, it is possible to perform the IP fax function in the fax device 10. The SIP URI is generally a number string more complicated than an internal line number or an external line number. According to the present exemplary embodiment, if the user designates an internal line number or an external line number which is a simple number string, the fax device 10 can transmit the fax data by the IP fax function. The user can easily make the fax device 10 perform the IP fax function.

Specifically, in the present exemplary embodiment, as shown in FIG. 6, the fax device 10 decides the QoS value by different deciding methods according to whether the number designated as the transmission destination of the fax data by the user is a number assigned to a device (the fax device 60) which is provided within the LAN 2, or not. That is, the fax device 10 can decide an appropriate QoS value based on whether the fax device 10 and the transmission destination device of the fax data exist in the same LAN 2, or not. Therefore, the fax device 10 can perform communication of fax data using an appropriate QoS value.

In general, in a case where communication of the fax data is performed using the SIP server 80 on the Internet 6, charging for the corresponding communication is performed; however, in a case where communication of the fax data is performed using only the SIP server 72 in the LAN 2, charging for the corresponding communication is not performed. Therefore, in the present exemplary embodiment, in a case of the communication for which charging is not performed (that is, transmission of the fax data from the fax device 10 to the fax device 60), the fax device 10 uses the QoS value of 2 Mbps corresponding to the maximum communication rate which the fax device 10 can implement. In this way, high-speed fax communication is implemented. On the other hand, in a case of communication for which charging is performed (that is, transmission of the fax data from the fax device 10 to the fax device 110), the fax device 10 uses a QoS value, at which the fee is the lowest, of 1 Mbps, 512 kbps, and 64 kbps. In this way, low-fee fax communication is implemented.

Incidentally, in the present exemplary embodiment, the fax device 10, the fax device 60, and the fax device 110 are examples of the communication apparatus, the internal device, and the external device, respectively. The four QoS values of 2 Mbps, 1 Mbps, 512 kbps, and 64 kbps are examples of the plurality of guaranteed bands. Further, the three QoS values of 1 Mbps, 512 kbps, and 64 kbps are examples of the two or more guaranteed bands. The method of STEP S82 and the method of STEP S86 in FIG. 6 are examples of the first deciding method and the second deciding method, respectively. Accordingly, 2 Mbps decided in STEP S82 of FIG. 6 is an example of the first guaranteed band, and the QoS value decided in STEP S86 of FIG. 6 is an example of the second guaranteed band. Further, the internal line number or the external line number designated as the transmission destination of the fax data by the user is an example of the specific identification information. The domain 'sip.com' is an example of the predetermined domain.

Second Exemplary Embodiment

Figure 7:
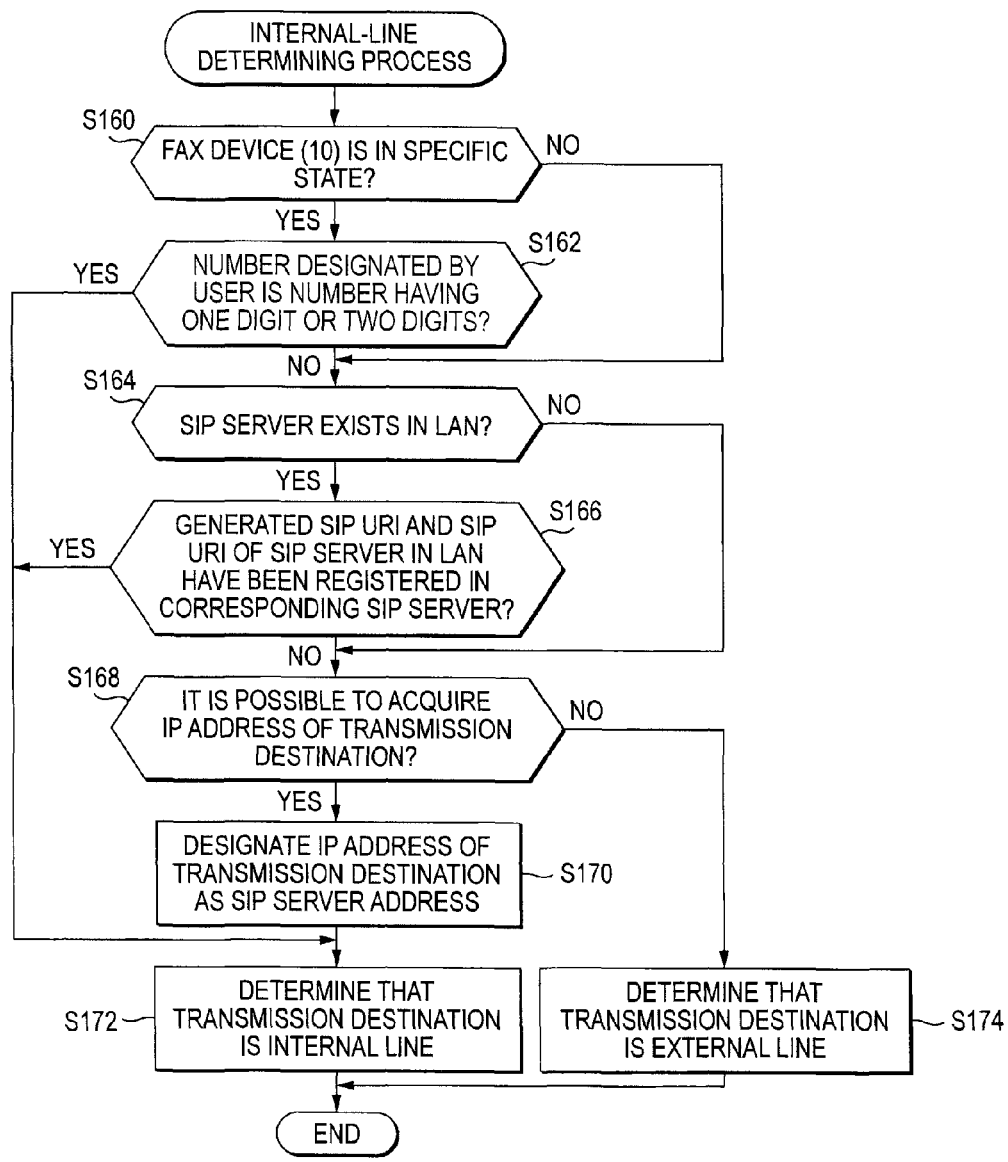
FIG. 7 shows a flow chart of an internal-line determining process according to a second exemplary embodiment.

The second exemplary embodiment is different from the first exemplary embodiment in the contents of STEP S36 of the internal-line determining process of FIG. 4. In the second exemplary embodiment, if STEP S30 ends, the fax transmission process proceeds to STEP S32 without performing the determination of STEP S31 of FIG. 4. As shown in FIG. 7, in the internal-line determining process of the second exemplary embodiment, in STEP 5160, the second determining unit 52 performs the same determination as that in STEP S31 of FIG. 4. In a case of Yes in STEP 5160, the internal-line determining process proceeds to STEP S162, and in a case of No in STEP S160, the internal-line determining process proceeds to STEP S164. STEP S162 is the same as STEP S62 of FIG. 5. In a case of Yes in STEP S162, the internal-line determining process proceeds to STEP S172, and in a case of No in STEP S162, the internal-line determining process proceeds to STEP S164. In STEP S172, the first determining unit 50 determines that the transmission destination is an internal line, as in STEP S64 of FIG. 5.

For example, in a case where the manager of the LAN 2 is not under contract with the specific provider, the specific provider does not provide the gateway 70 including the SIP server 72 to the manager. In this case, it is determined that the fax device 10 is not in the specific state (No in STEP S160), and the internal-line determining process proceeds to STEP S164. Even when the manager of the LAN 2 is not under contract with the specific provider, there are two methods ('first method' and 'second method', which will be described later) for performing the IP fax communication in the LAN 2.

(First Method)

The manager of the LAN 2 can prepare a SIP server (hereinafter, referred to as a specific SIP server), and install the specific SIP server in the LAN 2. The manager can map the SIP URI '1@sip.com' of the fax device 10 and the IP address 'IP10' of the fax device 10 with each other and register the SIP URI and IP address of the fax device 10 in the specific SIP server. Further, the manager can map the SIP URI '2@sip.com' of the fax device 60 and the IP address 'IP60' of the fax device 60 with each other and register the SIP URI and IP address of the fax device 60 in the specific SIP server. Furthermore, the manager can store the IP address of the specific SIP server in the memory 34 of the fax device 10.

In STEP S164, the first determining unit 50 determines whether the specific SIP server is provided within the LAN 2 or not. Specifically, in a case where the IP address of the specific SIP server has been stored in the memory 34, the result of the determination of the first determining unit 50 in STEP S164 becomes YES, and thus the internal-line determining process proceeds to STEP S166. On the other hand, in a case where the IP address of the specific SIP server has not been stored in the memory 34, the result of the determination of the first determining unit 50 in STEP S164 becomes NO, and thus the internal-line determining process proceeds to STEP S168.

In STEP S166, the first determining unit 50 transmits an inquiry command to the IP address of the specific SIP server as the transmission destination. The inquiry command includes the SIP URI '2@sip.com' of the transmission destination generated in STEP S34 of FIG. 4, and the SIP URI '1@sip.com' of the fax device 10. In a case where the two SIP URIs included in the inquiry command have been registered in the specific SIP server, the specific SIP server transmits a first response to the fax device 10. On the other hand, in a case where the two SIP URIs included in the inquiry command have not been registered in the specific SIP server, the specific SIP server transmits a second response to the fax device 10. In a case where the first response is received, a result of determination of the first determining unit 50 in step S166 becomes YES, and thus the internal-line determining process proceeds to STEP S172 in which the first determining unit 50 determines that the transmission destination is an internal line. On the other hand, in a case where the second response is received, the result of determination of the first determining unit 50 in step S166 becomes NO, and thus the internal-line determining process proceeds to STEP S168.

(Second Method)

The manager of the LAN 2 can map the SIP URI '2@sip.com' of the fax device 60 and the device name of the fax device 60 with each other and register the SIP URI and IP address of the fax device 10 in the memory 34 of the fax device 10. In STEP S168, the first determining unit 50 performs known name resolution using the device name of the fax device 60 mapped with the SIP URI '2@sip.com' of the transmission destination generated in STEP S34 of FIG. 4, so as to determine whether it is possible to acquire the IP address of the fax device 60. In a case of YES in STEP S168, in STEP S170, the first determining unit 50 designates the IP address of the fax device 60 acquired by the name resolution as the SIP server address designated as the transmission destination in the INVITE command, and then determines in STEP S172 that the transmission destination is an internal line. As a result, in STEP S42 of FIG. 4, the INVITE command directly reaches the fax device 60 (without passing through the SIP server).

Incidentally, in a case where it is impossible to acquire the IP address of the fax device 60 by the name resolution (NO in STEP S168), in STEP S174, the first determining unit 50 determines that the transmission destination is an external line, like in STEP S66 of FIG. 5. The other individual processes are the same as those in the first exemplary embodiment.

In the second exemplary embodiment, in a case where the result of the determination in any one of three kinds of processes (a first kind process of STEP S162, a second kind process of STEPS S164 and S166, and a third kind process of STEP S168) is positive, it is determined that the transmission destination is an internal line. Therefore, the fax device 10 can appropriately determine whether the fax device 10 and the transmission destination device of the fax data exist in the same LAN 2 or not. Incidentally, in the second exemplary embodiment, the three kinds of processes are performed; however, in a modification, only one or two kinds of processes may be performed. For example, only the first kind process and the second kind process may be performed or only the second kind process may be performed.

Incidentally, in the second exemplary embodiment, the specific SIP server is an example of the predetermined server. Further, the SIP URI '2@sip.com' of the fax device 60 and the SIP URI '1@sip.com' of the fax device 10 are examples of the first IP identification information and the second IP identification information, respectively.

Third Exemplary Embodiment

Figure 8:
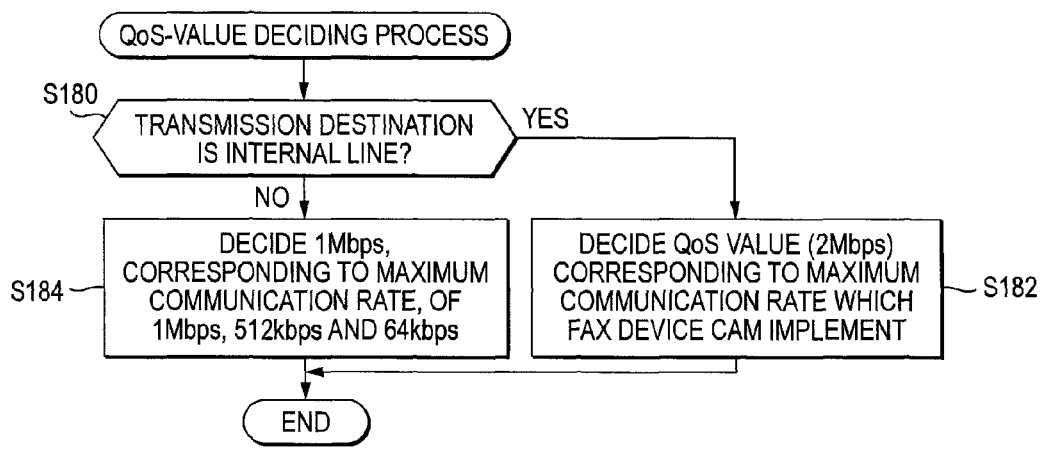
FIG. 8 shows a flow chart of a QoS-value deciding process according to a third exemplary embodiment.

The third exemplary embodiment is different from the first exemplary embodiment in the contents of STEP S38 of the internal-line determining process of FIG. 4. Similarly to the first exemplary embodiment, in the third exemplary embodiment, the determination of STEP S31 of FIG. 4 is performed. As shown in FIG. 8, STEPS S180 and S182 are the same as STEPS S80 and S82 of FIG. 6. However, in a case where it is determined in STEP S180 that the transmission destination is an external line, the deciding unit 54 decides the QoS value by a method different from that in the first exemplary embodiment. That is, in STEP S184, the deciding unit 54 decides the QoS value of 1 Mbps, corresponding to the maximum communication rate, of the three QoS values of 1 Mbps, 512 kbps, and 64 kbps, as the QoS value to be used for IP fax transmission.

According to the third exemplary embodiment, even in a case where the transmission destination is an external line, the fax device 10 can implement high-speed IP fax communication. In the third exemplary embodiment, 1 Mbps is an example of the first guaranteed band.

Modifications to Exemplary Embodiments

Exemplary embodiments of the present invention have been described above; however, these exemplary embodiments are merely examples, and do not limit the scope of claims. The technologies described in the scope of claims include various changes and modifications of the exemplified embodiments. Modifications of the exemplary embodiments will be exemplified later.

(1) In each of the above-described exemplary embodiments, in STEP S82 (S182 of FIG. 8), the deciding unit 54 decides the QoS value of 2 Mbps corresponding to the maximum communication rate which the fax device 10 can implement, as the QoS value to be used for transmission of the fax data. That is, in general, the first deciding method is a method that decides the first guaranteed band corresponding to the maximum communication rate which the communication apparatus can implement, as the specific guaranteed band. Alternatively, the first deciding method may be a method that decides a guaranteed band (for example, predetermined 1.5 Mbps) corresponding to a communication rate, which is lower than the maximum communication rate capable of being implemented by the communication apparatus (but is a relatively high communication rate), as the specific guaranteed band. In general, the first deciding method and the second deciding method may be different from each other.

(2) The communication apparatus may be a telephone device. In this case, voice data is an example of object data. Incidentally, other kinds of data such as text data may also be used as object data.

(3) Instead of using the gateway 70 having both of the SIP server function and the DHCP server function, the following configuration may be used. That is, a device having a SIP function, and a device having a DHCP server function may be separately provided, and a system in which those devices are provided in the LAN 2 may be established.

(4) Instead of the configuration in which the process of FIG. 3 is performed during start-up of the fax device 10, a configuration in which the process of FIG. 3 is performed at a timing (for example, a timing when an instruction is received from the user) different from the timing of the start-up of the fax device 10 may be used.

(5) The first determining unit 50 may determine whether the transmission destination is an internal line or not by a method different from that in each of the exemplary embodiments. For example, the user may designate a combination '2@192.168.0.1' of the internal line number '2' of the fax device 60 and the IP address of the fax device 60, as the SIP URI of the transmission destination of the fax data. In this case, if a value of a network address portion of the IP address of the fax device 10 corresponds to a value of a network address portion of the IP address of the fax device 60, that is, if the fax devices 10 and 60 are in the same network, it may be determined that the transmission destination is an internal line. In this modification, the combination is an example of the specific identification information.

The technical elements described in the present specification or the drawings exert technical utility singly or various combinations, and are not limited to combinations described in the claims at the time of the application. Also, the art illustrated in the present specification or the drawings can simultaneously achieve plural purposes, and the achievement itself of one of the purposes has technical utility.

According to another illustrative aspect of the invention, in the communication apparatus, wherein the first deciding method is a method that decides a first guaranteed band corresponding to the maximum communication rate that the communication apparatus can implement, as the specific guaranteed band.

According thereto, in a case where the communication apparatus and the transmission destination device of the object data exist in the same LAN, the communication apparatus can decide an appropriate guaranteed band.

According to still another illustrative aspect of the invention, in the communication apparatus, wherein the second deciding method is a method that decides a second guaranteed band, at which a fee required for transmitting the object data is the lowest, as the specific guaranteed band from a plurality of guaranteed bands that the communication apparatus can use for communication with an external device existing outside the LAN.

According thereto, in a case where the communication apparatus and the transmission destination device of the object data do not exist in the same LAN, the communication apparatus can decide an appropriate guaranteed band.

According to still another illustrative aspect of the invention, in the communication apparatus, wherein the second deciding method is a method that decides a third guaranteed band, corresponding to the maximum communication rate, as the specific guaranteed band from a plurality of guaranteed bands that the communication apparatus can use for communication with an external device existing outside the LAN.

According thereto, in a case where the communication apparatus and the transmission destination device of the object data do not exist in the same LAN, the communication apparatus can decide an appropriate guaranteed band.

According to still another illustrative aspect of the invention, in the communication apparatus, wherein the first determining unit is configured to: in a case where the specific identification information is a number having one digit or two digits, determine that the specific identification information is the identification information assigned to the internal device; and in a case where the specific identification information is a number having three or more digits, determine that the specific identification information is not the identification information assigned to the internal device.

According thereto, the communication apparatus can appropriately decide whether the communication apparatus and the transmission destination device of the object data exist in the same LAN or not.

According to still another illustrative aspect of the invention, the communication apparatus further comprises: a second determining unit configured to determine whether the communication apparatus is in a specific state in which the IP communication can be performed using first IP identification information, the first IP identification information being obtained by adding a predetermined domain to the specific identification information, wherein, in a case where the communication apparatus is determined to be in the specific state, the first determining unit determines whether the specific identification information is the identification information assigned to the internal device, the deciding unit decides the specific guaranteed band on the basis of the determination result of the first determining unit, and the first communication unit transmits the object data by performing the IP communication using the first IP identification information and the specific guaranteed band.

According thereto, in a case where the communication apparatus is in a specific state, the communication apparatus can perform data communication using an appropriate guaranteed band.

According to still another illustrative aspect of the invention, the communication apparatus further comprises: a second communication unit configured to transmit the object data by performing communication through a general public network using the specific identification information in a case where the communication apparatus is determined to be not in the specific state.

According thereto, in a case where the communication apparatus is not in a specific state, the communication apparatus can perform data communication using an appropriate guaranteed band.

According to still another illustrative aspect of the invention, in the communication apparatus, wherein the first determining unit is configured to: in a case where first IP identification information which is obtained by adding a predetermined domain to the specific identification information and second IP identification information that is IP identification information of the communication apparatus have been registered in a predetermined server existing in the LAN, determine that the specific identification information is the identification information assigned to the internal device, and in a case where the first IP identification information and the second IP identification information have not been registered in the predetermined server, determine that the specific identification information is not the identification information assigned to the internal device, and wherein the first communication unit is configured to transmit the object data by performing the IP communication using the first IP identification information and the specific guaranteed band.

According thereto, the communication apparatus can appropriately decide whether the communication apparatus and the transmission destination device of the object data exist in the same LAN or not.

What is claimed is:

1. A communication apparatus configured to perform IP communication using one of a plurality of guaranteed bands, comprising:
    a first determining unit configured to determine whether specific identification information designated as a transmission destination of object data, which is a transmission object, by a user is identification information assigned to an internal device existing in a LAN including the communication apparatus;
    a deciding unit configured to decide a specific guaranteed band to be used for transmission of the object data, from the plurality of guaranteed bands, based on the determination result of the first determining unit; and
    a first communication unit configured to transmit the object data by performing the IP communication using the specific identification information and the specific guaranteed band,
    wherein the deciding unit is configured to:
        in a case where the specific identification information is determined to be the identification information assigned to the internal device, decide the specific guaranteed band using a first deciding method; and
        in a case where the specific identification information is determined to be not the identification information assigned to the internal device, decide the specific guaranteed band using a second deciding method that is different from the first deciding method.

2. The communication apparatus according to claim 1, wherein the first deciding method is a method that decides a first guaranteed band corresponding to the maximum communication rate that the communication apparatus can implement, as the specific guaranteed band.

3. The communication apparatus according to claim 1, wherein the second deciding method is a method that decides a second guaranteed band, at which a fee required for transmitting the object data is the lowest, as the specific guaranteed band from a plurality of guaranteed bands that the communication apparatus can use for communication with an external device existing outside the LAN.

4. The communication apparatus according to claim 1, wherein the second deciding method is a method that decides a third guaranteed band, corresponding to the maximum communication rate, as the specific guaranteed band from a plurality of guaranteed bands that the communication apparatus can use for communication with an external device existing outside the LAN.

5. The communication apparatus according to claim 1, wherein the first determining unit is configured to:
    in a case where the specific identification information is a number having one digit or two digits, determine that the specific identification information is the identification information assigned to the internal device; and
    in a case where the specific identification information is a number having three or more digits, determine that the specific identification information is not the identification information assigned to the internal device.

6. The communication apparatus according to claim 1, further comprising:
    a second determining unit configured to determine whether the communication apparatus is in a specific state in which the IP communication can be performed using first IP identification information, the first IP identification information being obtained by adding a predetermined domain to the specific identification information,
    wherein, in a case where the communication apparatus is determined to be in the specific state,
        the first determining unit determines whether the specific identification information is the identification information assigned to the internal device,
        the deciding unit decides the specific guaranteed band on the basis of the determination result of the first determining unit, and
        the first communication unit transmits the object data by performing the IP communication using the first IP identification information and the specific guaranteed band.

7. The communication apparatus according to claim 6, further comprising:
    a second communication unit configured to transmit the object data by performing communication through a general public network using the specific identification information in a case where the communication apparatus is determined to be not in the specific state.

8. The communication apparatus according to claim 1, wherein the first determining unit is configured to:
    in a case where first IP identification information which is obtained by adding a predetermined domain to the specific identification information and second IP identification information that is IP identification information of the communication apparatus have been registered in a predetermined server existing in the LAN, determine that the specific identification information is the identification information assigned to the internal device; and
    in a case where the first IP identification information and the second IP identification information have not been registered in the predetermined server, determine that the specific identification information is not the identification information assigned to the internal device, and
    wherein the first communication unit is configured to transmit the object data by performing the IP communication using the first IP identification information and the specific guaranteed band.

9. A non-transitory computer-readable medium having a computer program stored thereon and readable by a computer installed in a communication apparatus capable of performing IP communication using one of a plurality of guaranteed bands, the computer program, when executed by the computer, causes the computer to perform processes comprising:
    a first determining process that determines whether specific identification information designated as a transmission destination of object data, which is a transmission object, by a user is identification information assigned to an internal device existing in a LAN including the communication apparatus;

a deciding process that decides a specific guaranteed band to be used for transmission of the object data, from the plurality of guaranteed bands, based on the determination result of the first determining process; and a first communication process that transmits the object data by performing the IP communication using the specific identification information and the specific guaranteed band, wherein the deciding process comprises:
    deciding the specific guaranteed band using a first deciding method in a case where the specific identification information is determined to be the identification information assigned to the internal device; and
    deciding the specific guaranteed band using a second deciding method that is different from the first deciding method in a case where the specific identification information is determined to be not the identification information assigned to the internal device.

* * * * *